(12) United States Patent
Emery et al.

(10) Patent No.: US 6,414,252 B1
(45) Date of Patent: *Jul. 2, 2002

(54) CALIBRATION SYSTEM FOR A WEIGHING SCALE

(75) Inventors: Jean-Christophe Emery, Schwerzenbach; Marc Iseli, Uster, both of (CH)

(73) Assignee: Mettler-Toledo GmbH, Greifensee (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,632

(22) Filed: Oct. 27, 1999

(30) Foreign Application Priority Data

Nov. 16, 1998 (DE) ............................ 198 52 670

(51) Int. Cl.⁷ .................... G01G 3/18; G01G 23/01; G01G 23/10
(52) U.S. Cl. ................ 177/229; 73/1.13; 73/1.15; 177/185
(58) Field of Search ................ 73/1.13, 1.15; 177/50, 210 EM, 212, 185, 229

(56) References Cited

U.S. PATENT DOCUMENTS

| 3,566,983 | A | * | 3/1971 | Weickhardt | 177/173 |
|---|---|---|---|---|---|
| 3,857,488 | A | * | 12/1974 | Le Cren | 177/185 |
| 4,799,561 | A | * | 1/1989 | Komoto | 177/229 |
| 4,813,505 | A | * | 3/1989 | Södler et al. | 177/212 |
| 4,890,246 | A | * | 12/1989 | Oldendorf et al. | 177/210 EM |
| 5,340,951 | A | * | 8/1994 | Hungerbühler et al. | 177/229 |
| 5,623,128 | A | * | 4/1997 | Grimm et al. | 177/229 |
| 5,641,948 | A |  | 6/1997 | Burkhard | 177/229 |
| 5,721,398 | A | * | 2/1998 | Balsen et al. | 177/185 |
| 5,771,986 | A | * | 6/1998 | Köhn et al. | 177/210 EM |
| 5,844,174 | A | * | 12/1998 | Kuhlmann et al. | 177/210 EM |
| 5,866,854 | A | * | 2/1999 | Emery et al. | 177/210 EM |
| 6,194,672 | B1 | * | 2/2001 | Burkhard et al. | 177/210 EM |
| 6,232,567 | B1 | * | 5/2001 | Bonino et al. | 177/210 EM |

FOREIGN PATENT DOCUMENTS

| DE | 38 38 151 A1 | 5/1990 |
| DE | 196 05 087 C2 | 5/1998 |
| EP | 00 93 183 A1 | 11/1983 |
| JP | 11108740 A | 4/1999 |

OTHER PUBLICATIONS

"McGraw–Hill Encyclopedia of Science and Technology, vol. 7", p. 555, copyright 1977.*

* cited by examiner

Primary Examiner—Randy W. Gibson
(74) Attorney, Agent, or Firm—Lawrence E. Laubscher, Sr.

(57) ABSTRACT

A lever system is provided for a weighing scale includes a transducer arrangement associated with an integral monolithic block for producing a weight signal corresponding with the weight of a load that is applied to the block. The lever system is operable to receive a calibration weight and to transmit to the load-receiving portion of the block a calibration force that is magnified by the lever system.

15 Claims, 3 Drawing Sheets

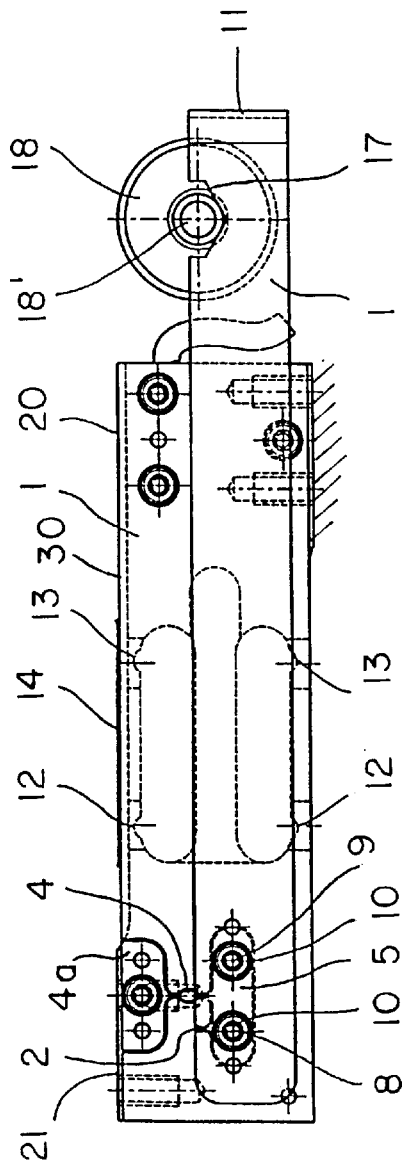
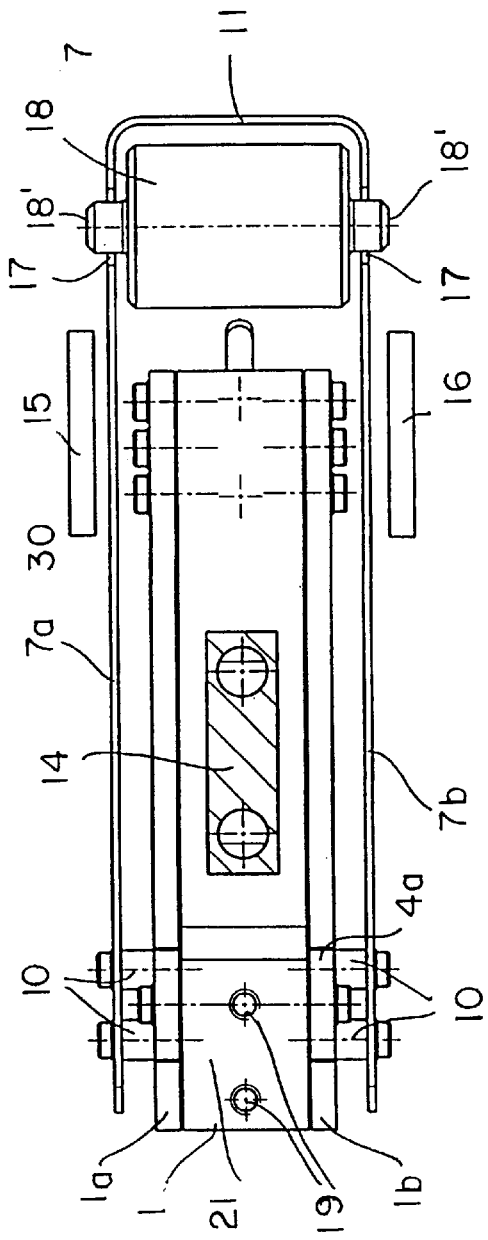
FIG. 2
FIG. 3

CALIBRATION SYSTEM FOR A WEIGHING SCALE

BACKGROUND OF THE INVENTION

1. Field of The Invention

The present invention relates to a calibration system for a weighing scale that has an electrical and/or optical force, transducer generating signals corresponding to the weight of an object that has been placed on a scale. The force transducer is attached to an elastic body that is coupled to a lever system, which lever system includes a receiving means for a calibration weight. The function of the force transducer is generally performed by a strain gauge, although in principle it would also be possible to use piezoelectric or other known devices. As an optical transducer, one might consider an interferometer of an essentially known type, e.g., a Michelson interferometer.

2. Brief Description of the Prior Art

Calibration systems of this kind are installed in weighing scales. At least at the conclusion of the manufacturing process, the scales are calibrated, and in most cases, the calibration is renewed within certain time intervals. Although the lever system has a receiving means for a calibration weight, the receiving means generally consists of the weighing pan or, in a wider sense, of the receiving means for the objects themselves that are to be weighed. This means that in some cases very heavy calibration weights have to be put on the scale or, also, that it is hardly practical to couple a calibration weight of a large mass directly to the lever system, given that the latter is generally configured as a separate built-in module. Additional difficulties arise if one attempts to effectively damp the oscillations occurring in a lever system of this type.

SUMMARY OF THE INVENTION

It is therefore the object of the present invention to provide improvements in the way lever systems of the type described above are calibrated and/or damped. According to the invention, this is accomplished by arranging the receiving means for the calibration weight on a magnifying lever, so that the force exerted by the calibration weight and/or the damper element is magnified. At least a portion of the inventive lever system, in some cases the entire system, is formed out of an elastic integral block.

Scales of the type described at the beginning are especially well suited for large weighing capacities, i.e., they are the kind of scales in which the calibration process according to the prior art is particularly difficult. However, by using a magnifying lever in an arrangement where the calibration weight and/or the force of a damper element is magnified by lever action, it is possible to use a much smaller calibration weight. As a result, lever systems and weighing scales of the kind described above can be easily calibrated and also very effectively damped by using the inventive arrangement.

Basically, two ways are conceivable in which the invention may be advantageously realized. The first way is to configure the magnifying lever together with at least a portion of the lever system, or in certain cases the entire lever system, as a lever that is cut out of and pivotally connected within an integral block, whereby the manufacture of the lever system is simplified and a more compact construction is achieved. The second way is to configure the magnifying lever as a separate lever that is attached to and extends beyond the contours of the integral block, so that the elastic integral block itself can be relatively compact and light-weight while still allowing a large lever magnification to be achieved.

In either case, if an elastic integral block is used, it is advantageous if the electrical force transducer is attached to the block rather than to a separate lever system or transmission member.

It is self-evident that lever systems of this kind in principle represent spring/mass systems and therefore have a tendency to oscillate. The invention can be very advantageously applied to alleviate this problem by means of an inductive damper element that cooperates with the (metallic) magnifying lever. In particular, the damper element comprises a permanent magnet in an arrangement where oscillation-damping eddy currents are generated in the lever.

It has been found that excellent results are obtained with an embodiment where the inductive damper element is arranged laterally alongside the lengthwise extension of the magnifying lever, although one would expect the damping force to be stronger with the magnet arranged at the transverse end face of the lever. Yet, according to the invention, the arrangement can be further developed and give even better results if at least two inductive elements are each arranged laterally on opposite sides of the lengthwise extension of the magnifying lever. "At least two" in this context means that the sides of a lever, especially a relatively large magnifying lever, offer ample space for more than two such damper elements. Also, a solution of this kind does not exclude the possibility of placing a third damper element, e.g., at the end face of the magnifying lever.

Further details of the invention are presented in the following description of embodiments that are illustrated schematically in the drawing.

BRIEF DESCRIPTION OF THE DRAWING

Other objects and advantages of the invention will become apparent from a study of the following specification when viewed in the light of the accompanying drawings, in which:

FIG. 2 represents a side view in the direction indicated by the arrow II of FIG. 1;

FIG. 3 represents a top view in the direction indicated by the arrow III of FIG. 1;

DETAILED DESCRIPTION OF THE INVENTION

According to the FIGS. 1 through 4, a lever system for a weighing scale comprises a block 1, preferably of monolithic configuration, of the kind that has become known in the field of weighing scales for example, as disclosed in U.S. Pat. No. 5,641,948 which is incorporated herein by reference in its entirety. The configuration of a single-piece, monolithic bending-elastic block like the block 1 can be seen in an exemplary way in the patent. Only as a brief summary, the subject of that patent is a lever system with lever arms that are cut out of a block by spark erosion and are pivotally connected by thin material portions. The levers themselves can be arranged in any manner to suit a given purpose.

Figure 1:
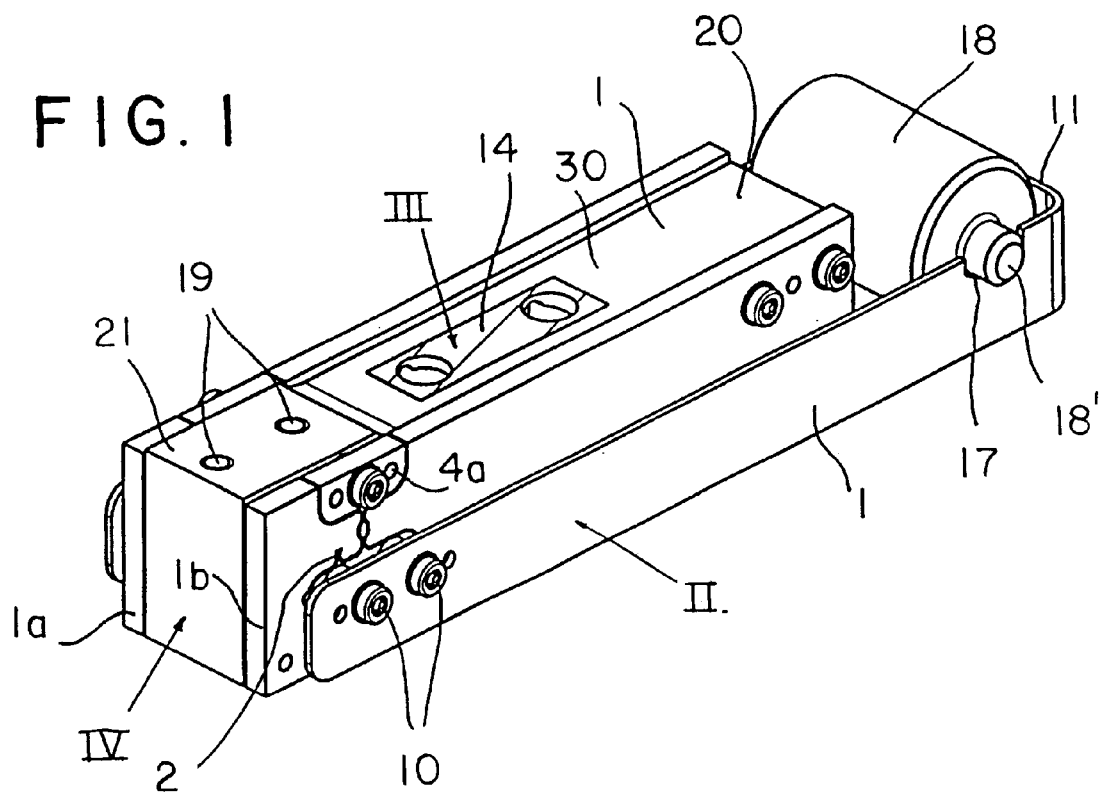
FIG. 1 represents a perspective view of a lever system according to the invention.
Figure 4:
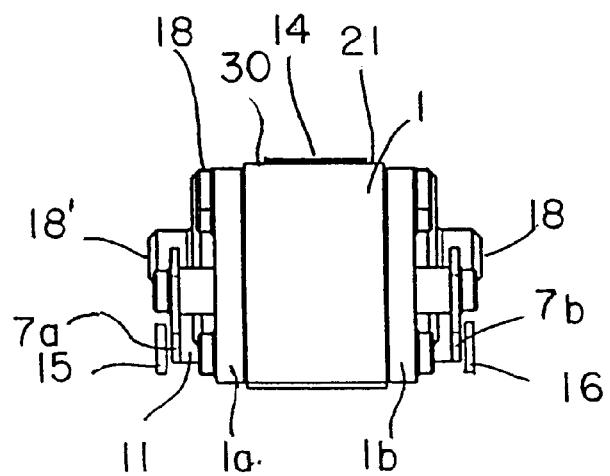
FIG. 4 represents an end view in the direction indicated by the arrow IV of FIG. 1.

It is evident that a block 1 of this kind generally has to be larger than the largest lever contained within it. Thus, for longer levers, the block will be relatively long and correspondingly heavy. To some degree, this puts a practical limit on the lever length. Now, in order to nevertheless achieve a particularly large lever magnification, an arrangement is provided in which a lever 5, rotatable about a thinned-down, elastically flexible fulcrum portion 2 (FIGS. 1, 2), is connected to the upper portion 21 of the block 1 through a coupling member 4. Two long lever arms 7a, 7b of a second lever 7 are attached to the lever 5 outside of the block 1 by means of fastener pins 10 passing through attachment holes 8, 9. As can be seen in FIGS. 1 to 3, the lever arms 7a, 7b (connected at the end by a U-turn segment 11) extend considerably beyond the length of the block 1 without significantly increasing the total weight. Now, when a force is applied to the magnifying lever 7, it will be transmitted in a very effective way to the upper portion 21 of the block 1 and thus in the end to an electrical force transducer in the form of at least one strain gauge 14 (shown only schematically in FIG. 1) at the top (and/or bottom) side of two flexure domains 12, 13 (FIG. 2) of block 1.

As shown with particular clarity in FIG. 3, permanent magnets 15, 16 are located preferably opposite the sides and as close as possible towards the end of the lever arms 7a, 7b so that any movement of the lever arms 7a, 7b is damped by eddy currents that are generated inside the metallic lever arms 7a, 7b. Of course, the arrangement shown here represents only one possibility among many, although it has proven to be particularly advantageous. For example, permanent magnets of this kind may be provided not only on the outside of the arms 7a, 7b but also at the opposite inside locations. Furthermore, more than one magnet may be arranged in a row along the arms 7a, 7b although the placement near the free ends clearly produces the greatest damping force. Finally, it is also conceivable to arrange a damper magnet in the area of the transverse U-turn segment As is further evident from the drawing, the free end of the lever arms 7a, 7b comprises a receiving means 17 for a calibration weight 18. The arrangement of the receiving means 17, as shown most clearly in FIGS. 2 and 3, consists of cutouts that are located opposite each other on the lever arms 7a, 7b. To define the seating position of the calibration weight 18, it is advantageous if the cutouts are at least in part V-shaped as indicated in FIG. 2 to receive the cylindrical axle 18' of the calibration weight 18. Clearly, this represents a particularly advantageous embodiment in comparison to other possible solutions, such as a triangular or prismatic axle 18' that could be received in a correspondingly shaped cutout. The receiving means 17 could also be formed by projections on the lever arms 7a, 7b, but this is less preferred from a manufacturing point of view. Nevertheless, using any one of these possible solutions, the weight that is used for the calibration can be made significantly lighter and easier to handle.

The advantage of the lever-magnified calibration weight is achieved by attaching the weighing pan (not shown in FIGS. 1 to 4) to the same area of the block 1 where the lever system introduces the force of the calibration weight into the block 1, i.e., the load-receiving area 21. The holes 19 are provided for the attachment of the weighing pan. The lever ratios within the block 1 in relation to the lever arm distance of the receiving means 17 for the calibration weight have to be appropriately adapted, so that the calibration weight generates the correct amount of load on the block 1. The stationary side 20 is located at the opposite end of the block 1.

Figure 5:
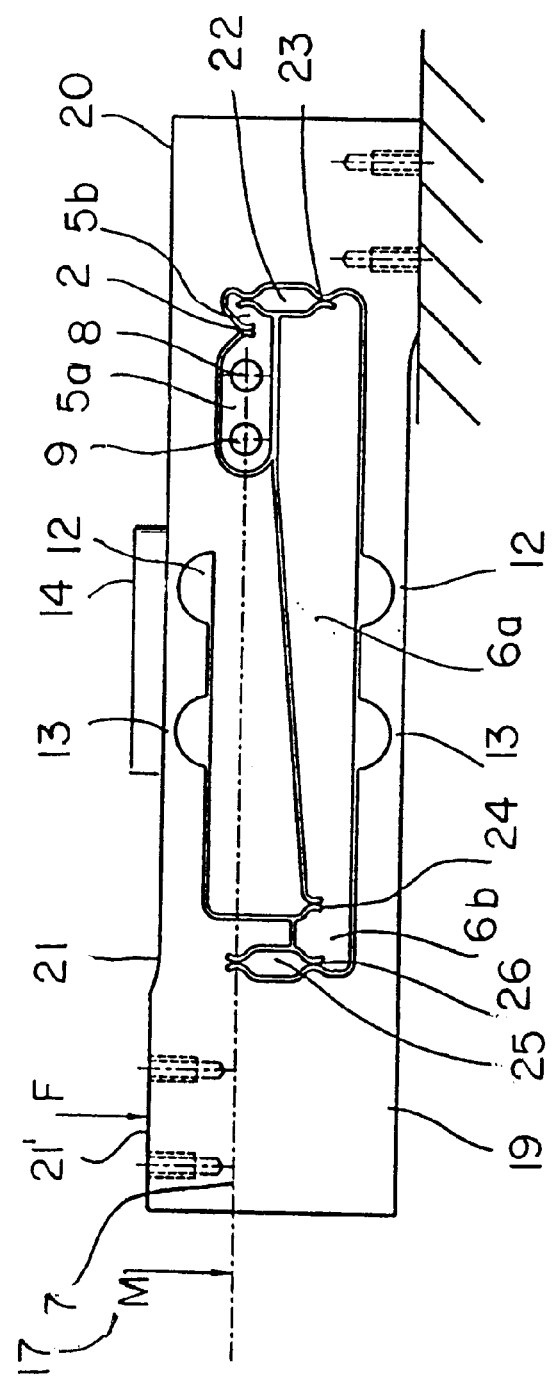
FIG. 5 represents a side view of a particularly preferred embodiment seen from the same direction as the embodiment in FIG. 2.

FIG. 5 represents a further embodiment of a single monolithic block 100. In the following description of this embodiment, parts that perform the same function as in the previously discussed figures are identified by the same reference numbers. Thus, the description of the respective elements need not be repeated in detail.

In the embodiment the single monolithic block 100 that is shown in FIG. 5, the magnifying lever 7 is shown only schematically. As in the preceding example, the lever 7 is attached to the integral lever 5 by means of pins (see ref. 10 in the preceding figures) engaged in attachment holes 8, 9, and the lever 5 is rotatable about a thinned-down, elastically flexible fulcrum portion 2. The lever 5 is a two-armed lever with a relatively long arm 5a, and a relatively short lever arm 5b extending to the right of the fulcrum 2, so that the calibration weight M placed on the magnifying lever 7 at the location 17 is magnified at the ratio of the lever arms 7 and 5b and introduced into a first coupling member 22. The coupling member 22 is connected through a flexible pivot portion 23 to the end of a relatively long lever arm 6a of a lever 6 that is rotatable about a further spatially fixed fulcrum portion 24. The lever 6 comprises a two-armed lever that has a longer first arm 6a, and a shorter second arm 6b. As a result, the calibration weight placed at location 17 is magnified a second time.

Not the least of the factors to be considered, the lever ratio represents the relationship between the calibration weight and an equivalent weighing load placed on the scale. Here, too, the locations 12 and 13 represent flexural domains on the intermediate portion 30 of the monolithic block for mounting a strain gauge 14. It is also self-evident that damper magnets can again be arranged to cooperate with the magnifying lever 7 in the same advantageous manner as the magnets 15, 16 in the preceding figures.

Numerous variations are possible within the scope of the invention. For example, the lever 7, too, could in principle be a part of the block 1, but this would make the block too large and heavy, which is why the illustrated embodiment with a separate lever 7 attached to the block 1 is preferable. Theoretically, the damper elements could also be electromagnets instead of the permanent magnets 5, 6 shown, although this appears to be less practical.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A calibration system for a weighing scale, including:
    (a) monolithic block means including a rectangular elastic monolithic main block (1) having a stationary end portion (20), a load-receiving end portion (21) adapted to receive a load the weight of which is to be measured, and an intermediate portion (30) contained between said end portions;
    (b) transducer means (14) associated with said main block intermediate portion for producing a weight signal that is a function of the displacement produced by a load applied to said main block load-receiving end portion relative to said main block stationary end portion; and
    (c) calibration means for applying to said main block load-receiving portion a calibrating force, comprising:
        (1) means (17) for receiving a calibration weight (18); and
        (2) magnifying lever means connected with said calibration weight receiving means for applying to said main block load-receiving end portion a calibrating force that is greater than the weight of said calibration weight, said magnifying lever means including:
(a) at least a first lever (5) coupled with said main block load-receiving end portion;
(b) fulcrum means (2) supporting said first lever for pivotal movement relative to said main block stationary end portion; and
(c) coupling means (4) coupling said first lever with said main block load-receiving end portion.

2. The calibration system according to claim 1, wherein said magnifying lever means further includes a magnifying lever (7) connected at one end with said first lever and extending at its other end lengthwise beyond said stationary end of said main monolithic block.

3. The calibration system as defined in claim 1, wherein said monolithic block means further includes a pair of monolithic side blocks (1a, 1b) arranged on opposite sides of said main monolithic block, a pair of said first levers being formed in said side blocks, respectively.

4. The calibration system as defined in claim 1, wherein said first lever comprises an integral portion of said main monolithic block.

5. The calibration system according to claim 4, and further comprising means defining within said main monolithic block a second magnifying lever (6) for transferring to said main block load-receiving portion a further increased force of the calibration weight.

6. The calibration system according to claim 1, wherein said transducer means comprises strain sensitive electrical signal generating means (14) attached to said intermediate portion of said main monolithic block.

7. The calibration system according to claim 1, wherein said transducer means comprise displacement sensitive optical means.

8. The calibration system according to claim 1, comprising at least one damper element exerting a damping force on said magnifying lever means, said damper element being arranged so that the damping force is magnified by said magnifying lever means.

9. The calibration system according to claim 2, wherein said magnifying lever means consists of metal, and further including at least one inductive damper element comprising a permanent magnet arranged to generate eddy currents in said magnifying lever means and thereby damp oscillations in the lever system.

10. The calibration system according to claim 9, wherein said inductive damper element is arranged laterally alongside the lengthwise extension of said magnifying lever means.

11. The calibration system according to claim 10, wherein at least two inductive damper elements are each arranged laterally on a respective side of the lengthwise extension of said magnifying lever means.

12. The calibration system defined in claim 1, wherein said first lever, said fulcrum means, and said coupling means are formed as integrally connected portions defined in said main block by material free spaces.

13. The calibration system defined in claim 12, wherein said first lever, said fulcrum means and said coupling means are formed by linear cuts that traverse said monolithic main block.

14. The calibration system defined in claim 1, and further including at least one second monolithic block within which are defined by material free spaces said first lever, said fulcrum means, and said coupling means.

15. The calibration system defined in claim 14, wherein said first lever, said fulcrum means and said coupling means are formed by linear cuts that traverse said second monolithic block.

* * * * *